(12) United States Patent
Persson et al.

(10) Patent No.: US 11,089,815 B2
(45) Date of Patent: Aug. 17, 2021

(54) METHOD AND ARRANGEMENT FOR PORTION-PACKING OF AN ORAL POUCHED SNUFF PRODUCT

(71) Applicant: Swedish Match North Europe AB, Stockholm (SE)

(72) Inventors: Tony Persson, Herrljunga (SE); Jonas Lindberg, Trollhättan (SE)

(73) Assignee: SWEDISH MATCH NORTH EUROPE AB, Stockholm (SE)

( * ) Notice: Subject to any disclaimer, the term of this patent is extended or adjusted under 35 U.S.C. 154(b) by 331 days.

(21) Appl. No.: 16/347,795

(22) PCT Filed: Nov. 27, 2017

(86) PCT No.: PCT/EP2017/080469
§ 371 (c)(1),
(2) Date: May 6, 2019

(87) PCT Pub. No.: WO2018/099843
PCT Pub. Date: Jun. 7, 2018

(65) Prior Publication Data
US 2019/0291900 A1    Sep. 26, 2019

(30) Foreign Application Priority Data

Dec. 2, 2016   (EP) .................................. 16201939
Dec. 12, 2016  (EP) .................................. 16203426

(51) Int. Cl.
*A24F 23/02*     (2006.01)
*B29C 65/08*     (2006.01)
(Continued)

(52) U.S. Cl.
CPC ............. *A24F 23/02* (2013.01); *A24B 13/00* (2013.01); *A24B 15/10* (2013.01); *B29C 65/00* (2013.01);
(Continued)

(58) Field of Classification Search
CPC ......... A24B 13/00; A24B 15/10; B29C 65/00; B29C 65/08; B29C 65/081; B29C 65/086;
(Continued)

(56) References Cited

U.S. PATENT DOCUMENTS 4,607,479 A * 8/1986 Linden .................... B65B 9/087
53/530
4,703,765 A * 11/1987 Paules .................... B65B 61/08
131/112

(Continued)

FOREIGN PATENT DOCUMENTS

DE       20 45 545 A1    3/1972
DE    10 2014 101802 A1    8/2015
(Continued)

OTHER PUBLICATIONS

International Search Report for International Application No. PCT/EP2017/080469 dated May 3, 2018.
(Continued)

*Primary Examiner* — Dariush Seif
(74) *Attorney, Agent, or Firm* — Knobbe Martens Olson & Bear LLP

(57) ABSTRACT

The present invention relates to a method for portion-packing of an oral pouched snuff product (1', 1"). The method comprises a) supplying and advancing a tubular web (19, 19', 19") of packaging material enveloping a continuous feed (23, 23', 23a", 23b") of filling material in a direction of travel (L), b) forming transverse seals (39) in the tubular web across the continuous feed of filling material by means of ultrasonic welding, the transverse seals extending in a transverse direction (T) being perpendicular to the direction of travel. The present invention further relates to an arrangement (17, 17', 17") for portion-packing of an oral pouched snuff product.

21 Claims, 5 Drawing Sheets

(51) Int. Cl.

| | | |
|---|---|---|
| *B29C 65/74* | (2006.01) | |
| *B29C 65/78* | (2006.01) | |
| *B29C 65/00* | (2006.01) | |
| *B65B 9/02* | (2006.01) | |
| *B65B 9/067* | (2012.01) | |
| *B65B 9/12* | (2006.01) | |
| *B65B 9/20* | (2012.01) | |
| *B65B 29/00* | (2006.01) | |
| *B65B 51/30* | (2006.01) | |
| *B65B 51/26* | (2006.01) | |
| *B65B 61/00* | (2006.01) | |
| *B65B 51/16* | (2006.01) | |
| *A24B 13/00* | (2006.01) | |
| *A24B 15/10* | (2006.01) | |
| *B65B 51/22* | (2006.01) | |
| *B65B 61/06* | (2006.01) | |
| *B65D 75/44* | (2006.01) | |
| *B29L 31/00* | (2006.01) | |

(52) U.S. Cl.
CPC ............ *B29C 65/08* (2013.01); *B29C 65/081* (2013.01); *B29C 65/086* (2013.01); *B29C 65/087* (2013.01); *B29C 65/74* (2013.01); *B29C 65/749* (2013.01); *B29C 65/7443* (2013.01); *B29C 65/7894* (2013.01); *B29C 66/1122* (2013.01); *B29C 66/133* (2013.01); *B29C 66/43* (2013.01); *B29C 66/4312* (2013.01); *B29C 66/4322* (2013.01); *B29C 66/71* (2013.01); *B29C 66/7294* (2013.01); *B29C 66/73921* (2013.01); *B29C 66/81415* (2013.01); *B29C 66/81417* (2013.01); *B29C 66/81425* (2013.01); *B29C 66/81427* (2013.01); *B29C 66/81469* (2013.01); *B29C 66/83411* (2013.01); *B29C 66/83413* (2013.01); *B29C 66/83513* (2013.01); *B29C 66/83543* (2013.01); *B29C 66/849* (2013.01); *B29C 66/8432* (2013.01); *B29C 66/8491* (2013.01); *B65B 9/02* (2013.01); *B65B 9/023* (2013.01); *B65B 9/067* (2013.01); *B65B 9/12* (2013.01); *B65B 9/20* (2013.01); *B65B 9/2021* (2013.01); *B65B 29/00* (2013.01); *B65B 51/16* (2013.01); *B65B 51/225* (2013.01); *B65B 51/26* (2013.01); *B65B 51/303* (2013.01); *B65B 51/306* (2013.01); *B65B 61/005* (2013.01); *B65B 61/06* (2013.01); *B65D 75/44* (2013.01); *B29L 2031/7122* (2013.01); *B29L 2031/7128* (2013.01); *B65B 2220/06* (2013.01); *B65B 2220/22* (2013.01)

(58) Field of Classification Search
CPC ... B29C 65/087; B29C 65/74; B29C 65/7443; B29C 65/749; B29C 65/7894; B29C 65/1122; B29C 66/133; B29C 66/43; B29C 66/4312; B29C 66/4322; B29C 66/71; B29C 66/7294; B29C 66/73921; B29C 66/81415; B29C 66/81417; B29C 66/81425; B29C 66/81427; B29C 66/81469; B29C 66/83411; B29C 66/83413; B29C 66/83513; B29C 66/83543; B29C 66/8432; B29C 66/849; B29C 66/8491; B65B 9/02; B65B 9/023; B65B 9/067; B65B 9/12; B65B 9/20; B65B 9/2021; B65B 29/00; B65B 51/16; B65B 51/225; B65B 51/26; B65B 51/303; B65B 51/306; B65B 61/005; B65B 61/06; B65B 2220/06; B65B 2220/22; B65D 75/44; B29L 2031/7122; B29L 2031/7128
USPC .......................................................... 53/450
See application file for complete search history.

(56) References Cited

U.S. PATENT DOCUMENTS

| | | | |
|---|---|---|---|
| 6,135,120 A | 10/2000 | Lofman et al. | |
| 8,122,893 B2* | 2/2012 | Boldrini | B65B 29/00 131/112 |
| 8,268,370 B2* | 9/2012 | Miser | A61P 39/06 424/751 |
| 9,623,988 B2* | 4/2017 | Garthaffner | B65B 57/14 |
| 10,647,459 B2* | 5/2020 | Persson | A24B 13/00 |
| 2007/0261707 A1* | 11/2007 | Winterson | B65B 9/207 131/352 |
| 2009/0304875 A1* | 12/2009 | Zerfas | B65B 9/20 426/122 |
| 2011/0180087 A1* | 7/2011 | Gee | A24B 13/00 131/352 |
| 2011/0289887 A1* | 12/2011 | Garthaffner | B65B 9/213 53/438 |
| 2012/0031416 A1* | 2/2012 | Atchley | D04H 3/11 131/354 |
| 2012/0067362 A1* | 3/2012 | Mola | A24B 13/00 131/359 |
| 2012/0073588 A1* | 3/2012 | Kawata | B65D 75/10 131/352 |
| 2012/0073589 A1* | 3/2012 | Kawata | A24B 13/00 131/352 |
| 2013/0091806 A1* | 4/2013 | Williams | B65B 1/30 53/452 |
| 2013/0276805 A1* | 10/2013 | Mola | A24F 23/02 131/352 |
| 2016/0165953 A1* | 6/2016 | Goode, Jr. | A24B 13/00 131/352 |
| 2017/0152064 A1* | 6/2017 | Aurand | B29C 65/08 |
| 2017/0273348 A1* | 9/2017 | Klipfel | A24B 3/08 |
| 2018/0257801 A1* | 9/2018 | Persson | B29C 66/0042 |

FOREIGN PATENT DOCUMENTS

| | | |
|---|---|---|
| EA | 003007 B1 | 12/2002 |
| EA | 012674 B1 | 12/2019 |
| EP | 0 023 128 A1 | 1/1981 |
| EP | 2 428 450 B1 | 3/2012 |
| WO | WO 00/40465 A1 | 7/2000 |
| WO | WO 2006/120570 A2 | 11/2006 |
| WO | WO 2015/107484 | 7/2015 |
| WO | WO 2017/093488 | 6/2017 |

OTHER PUBLICATIONS

International Preliminary Report on Patentability for International Application No. PCT/EP2017/080469 dated Mar. 29, 2019.
Search Report for Russian Patent Application No. 2019120372 dated Dec. 25, 2020.

* cited by examiner

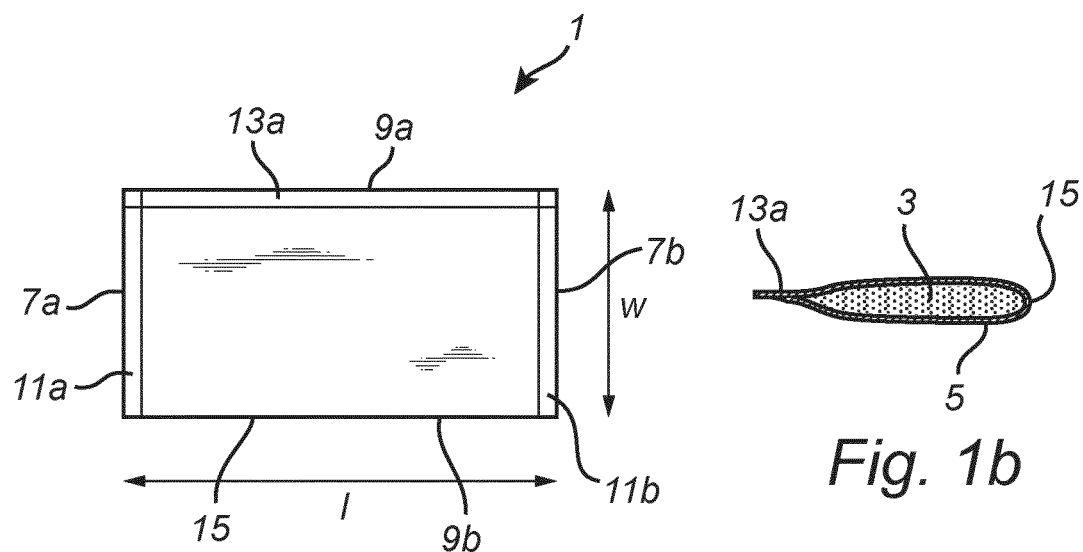
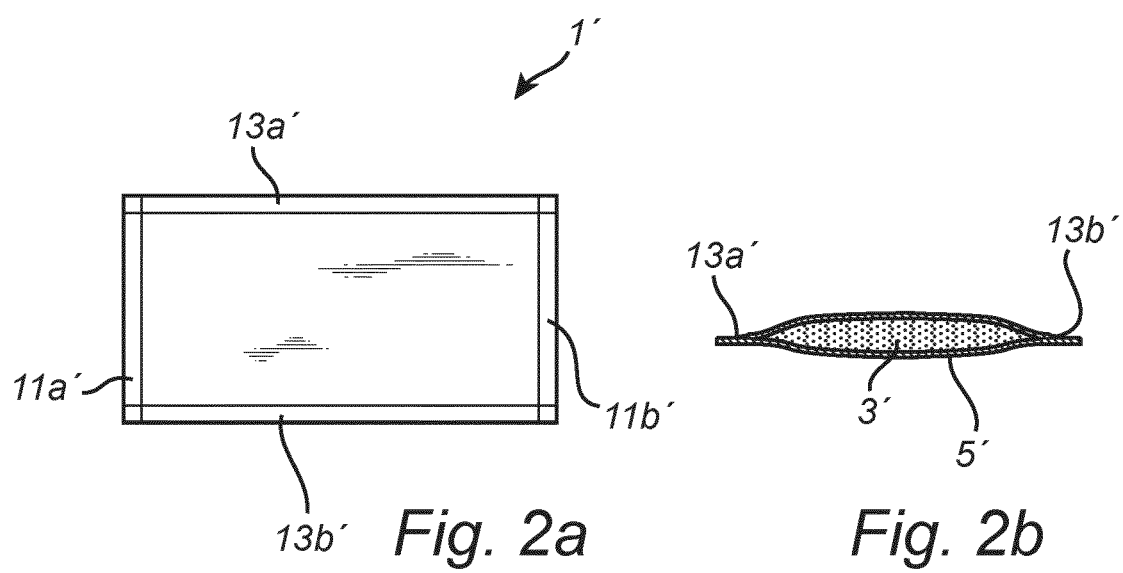

METHOD AND ARRANGEMENT FOR PORTION-PACKING OF AN ORAL POUCHED SNUFF PRODUCT

CROSS REFERENCE TO RELATED APPLICATIONS

This application is a U.S. National Phase Application of PCT International Application Number PCT/EP2017/080469, filed on Nov. 27, 2017, designating the United States of America and published in the English language, which is an International Application of and claims the benefit of priority to European Patent Application No. 16201939.2, filed on Dec. 2, 2016, and European Patent Application No. 16203426.8, filed on Dec. 12, 2016. The disclosures of the above-referenced applications are hereby expressly incorporated by reference in their entireties.

The present invention relates to a method for portion-packing of an oral pouched snuff product. The present invention further relates to an arrangement for portion-packing of an oral pouched snuff product.

BACKGROUND

Pouched smokeless tobacco products may be produced by measuring portions of the smokeless tobacco composition and inserting the portions into a nonwoven tube. U.S. Pat. No. 4,703,765 discloses a device for packaging precise amounts of finely divided tobacco products, such as snuff tobacco or the like, in a tubular packaging material into which snuff portions are injected via a fill tube. Downstream from the tube, welding means are positioned for transverse sealing of the packaging material, and also cutting means for severing the packaging material in the area of the transverse seal to thus form discrete or individual portion packages. EP 2 428 450 B1 relates to a snus dosing method, wherein a portion of tobacco is filled into a dosing chamber of a dosing device and then blown out of the dosing chamber by means of blow-out air to which water vapour has been added.

Pouched smokeless tobacco products may alternatively be produced by placing portions of moist snuff on a nonwoven web using a pouch packer machine in accordance with the device disclosed in U.S. Pat. No. 6,135,120. This technique is also referred to as the "NYPS" technique. This device comprises feeding means for feeding the tobacco material into pockets formed in a rotary portioning wheel for portioning the material into portions, at least one compression means for compressing the tobacco material portions, a unit for advancing a packaging material, such as a nonwoven web, in synchrony with the compressed portions, at least one discharge means for discharging the portions from the pockets to the packaging material, and a forming unit for forming individual portion packages, i.e. pouched smokeless tobacco products, from the discharged portions and the packaging material. At the intended point of discharge of the portions of to the packaging material, the packaging material has the form of a tape, the compression means being arranged to compress the portions in a direction which differs from the discharging and the feeding directions. The compression is preferably effected in a direction perpendicular to the discharging and the feeding directions. The compression may be effected in the axial direction of the portioning wheel whereas the feeding and discharging may be effected in the radial direction of the wheel.

The packaging material is typically made of a nonwoven fleece, i.e. a soft fabric material, such as viscose, including an acrylic polymer that acts as binder in the nonwoven material and provides for heat-melt welding of the pouches during manufacturing thereof. The viscose nonwoven material normally used for pouched smokeless tobacco products is similar to the fabric used in tea bags. Nonwovens are fabrics that are neither woven nor knitted. Methods for manufacturing of nonwoven materials are commonly known in the art.

Oral pouched smokeless tobacco products are normally sized and configured to fit comfortably and discreetly in a user's mouth between the upper or lower gum and the lip. In general, oral pouched smokeless tobacco products have a pillow-like shape, which typically is substantially rectangular. Square is herein seen as a special case of rectangular. Some typical shapes, expressed as length×width, of commercially available oral pouched smokeless tobacco products are, for instance, 37 mm×20 mm, 34/37 mm×14 mm, 31/34 mm×18 mm, and 27/28 mm×14 mm. Each oral pouched snuff products may have a maximum length within the range of from 25 to 37 mm along the longitudinal direction of the product and a maximum width within the range of from 12 to 20 mm along the transverse direction of the product. The thickness, "height", of the pouched product is normally within the range of from 2 to 8 mm, such as from 5 to 7 mm. The total weight of commercially available oral pouched smokeless tobacco products are typically within the range from about 0.3 to about 3.5 g, such as from about 0.5 to 1.7 g, per pouched product. A pouched product typically includes parallel transverse seals at opposite ends and at least one longitudinal seal orthogonal to the transverse seals. The seals should be of sufficient strength to preserve the integrity of the pouched product during use while not disturbing the user's experience.

Patent document U.S. Pat. No. 8,122,893 B2 discloses a machine for manufacturing of pouches of a smokeless tobacco product. The machine comprises an intermittently rotatable dispensing disc with peripheral cavities, a station at which each cavity is filled with a given quantity of tobacco equivalent to a single portion, a push rod mechanism by which the portions of tobacco are ejected from each cavity of the disc at a transfer station, and a connecting duct through which the portion of tobacco ejected by the push rod from each cavity passes directly to a wrapping station where the pouches are formed, filled with the tobacco product and sealed. A rectilinear duct connects the transfer station with the wrapping station. The wrapping station comprises a tubular element positioned at the outlet end of the rectilinear duct, around which a tubular envelope of wrapping material is formed. The tubular envelope is sealed longitudinally by ultrasonic welders operating in close proximity to the tubular element. The machine also comprises sealing means located beneath the tubular element, of which the function is to bond the tubular envelope transversely in such a manner as to form a continuous succession of pouches, each containing a relative portion of tobacco. Downstream of the transverse sealing means, the machine comprises a pair of transport belts looped around respective pulleys positioned to take up and direct the continuous succession of pouches toward cutting means by which the succession of pouches is divided up into single units.

Patent document DE 10 2014 101802 A1 discloses a device and a method for ultrasonic sealing and separation of tubular bags.

Patent document EP 0 023 128 A1 discloses a device and a method for manufacturing tea bags and the like from a tubular web.

Production efficiency is highly important from an economic perspective, and thus it is generally desirable to be able to produce at high speeds. During portion-packaging of filling material, e.g. snuff composition, in the manufacturing of oral pouched snuff products, filling material may stick to the packaging apparatus, which may require cleaning of the apparatus and thus undesired down-time in the manufacturing. Thus, there is a need for an improved method for portion-packaging of snuff composition which provides for less down-time as well as high speed manufacturing.

SUMMARY

The object of the present disclosure is to overcome or ameliorate at least one of the disadvantages of the prior art, or to provide a useful alternative.

The object above may be achieved by the subject-matter of claim 1. Embodiments are set forth in the appended dependent claims, in the following description and in the drawings.

The present invention relates to a method for portion-packing of an oral pouched snuff 35 product. The method comprises
a) supplying and advancing a tubular web of packaging material enveloping a continuous feed of filling material in a direction of travel,
b) forming transverse seals in the tubular web across the continuous feed of filling material by means of ultrasonic welding, the transverse seals extending in a transverse direction being perpendicular to the direction of travel.

As mentioned above, oral pouched snuff products are commonly produced by measuring portions of the filling material. However, according to the present invention, it is instead possible to use a continuous feed of filling material. The method described herein is less complex than prior art methods, since it is easier to feed a continuous feed than to supply the filling material as portions. Thereby the production speed may be increased.

In addition, the method of the present invention facilitates easier handling of sticky filling materials, such as such as a snuff composition, which in conventional portion-packing may stick to the interior of a portion measuring device and thereby entail down-time in production due to cleaning of the device as well as waste of filling material. Thus, the method described herein provides for simplified high-speed production of oral pouched snuff productions, such as about 100-200 pouched products per minute, with less waste of filling material and less down-time during production.

Moreover, the method as described herein provides for well-filled oral pouched snuff products as a result of transverse seals being formed across a continuous feed of filling material by means of ultrasonic welding.

The portion-packed oral pouched snuff product may be a smokeless tobacco product or non-tobacco snuff product. As mentioned above, the filling material may comprise a smokeless tobacco or tobacco-free material, which may be nicotine-containing or nicotine free. The filling material may also be referred to as filling composition or snuff composition.

The term "tubular web" as used herein relates to that the tubular web envelops the continuous feed of filling material, thereby forming a kind of tubular structure around the continuous feed of filling material. The term "tubular web" does not necessarily imply a circular cross-section. Instead the cross section may be substantially rectangular, elliptic or oval. If the direction of travel is horizontal, the cross section of the tubular web typically is substantially rectangular or oval. If the direction of travel is vertical, the cross section of the tubular web typically is circular, substantially rectangular, elliptic or oval.

The direction of travel coincides with a longitudinal direction of the tubular web. The filling material is longitudinally enveloped, i.e. the filling material is enveloped as seen in the longitudinal direction coinciding with the direction of travel. This may be obtained by means of one or more longitudinal folds in the packaging material and/or by means of one or more longitudinal seals, as is further described below.

Transverse seals are formed in the tubular web, which thus is divided into separate pouches. The distance between two subsequent transverse seals determines the length of the resulting oral pouched snuff product and may e.g. be selected to be in the range of from 25 to 37 mm. The transverse seal at a front end of a product and the transverse seal at the rear end of the product, together with the tubular web longitudinally enveloping the filling material results in that the filling material of the manufactured oral pouched snuff product is enclosed at all side edges of the pouched product.

The transverse seals are formed by ultrasonic welding. A first portion of the packaging material located at one side of and in contact with the filling material, e.g. below the filling material, is attached to a second opposite portion of the packaging material located at a second opposite side of and in contact with the filling material, e.g. above the filling material. The transverse seal may have a width equal to or less than 2 mm, such as within the range of from 0.1 mm to 2 mm or 0.1 mm to 1 mm or 0.1 to 0.5 mm. Such narrow seals look aesthetically appealing. Further, the narrow seal may contribute to a sense of comfort when the portion-packed oral pouched snuff product is in use. Narrower seams have the further advantage that the required amount of packaging material is reduced.

In ultrasonic welding, a sonotrode, also called an ultrasonic horn, is utilized. It is adapted for transmitting ultrasonic energy and provides ultrasonic vibrations and applies the vibrational energy to the tubular web to provide energy for the sealing. The sonotrode operates together with an anvil, such that a gap is formed between the sonotrode and the anvil allowing passage of the tubular web. Ultrasounds have frequencies higher than the upper audible limit of a human, which is about 20 kHz for a young adult, kHz standing for kilohertz. The frequency used for the sonotrode in the ultrasonic welding as described herein may be in the range of from 20 kHz to 45 kHz, e.g. 20 kHz, 37 kHz or 40 kHz. The effect may be in the range of from 100 Watt to 300 Watt. The frequency and the effect are suitably adapted to the material to be welded, and may thus vary e.g. between different packaging materials.

Step b) may comprise
b1) applying a pressure to the tubular web in a zone corresponding to an intended location of one of the transverse seals, thereby moving at least a portion of the filling material away from the zone, and thereafter
b2) ultrasonically welding while continuing to apply pressure in the zone.

The filling material, which is located in the zone before the pressure is applied, is then more or less removed from the zone in step b1). The filling material may be pressed backwards and/or forwards as seen in the direction of travel. It may then be preferred that there is enough free space at the side of the continuous feed of filling material to allow the filling material behind or in front of the transverse seal to move in the transverse direction.

As an alternative or a complement, the feed of filling material may be loosely packed, such that it can be locally compressed when filling material is pressed away from the zone.

Both of steps b1) and b2) are preferably performed by a single welding unit, which may comprise at least one angled surface which may assist in moving the filling material away from the zone. The angled surface may be located in the sonotrode and/or in the anvil. In that case, step b1) with only applying pressure may be performed for pressures up to a preselectable pressure limit, e.g. being in the range of from 100 to 500 kPa, or 200 to 400 kPa. For pressures above the pressure limit, step b2) is performed, i.e. welding while applying pressure. The pressure may be gradually or stepwise increased.

The ultrasonic welding unit preferably comprises an operation surface with a pair of angled surfaces, with one surface angled in a forward direction as seen in the direction of travel and one in a backward direction as seen in the direction of travel. The angled surfaces may be located in the sonotrode and/or in the anvil. Preferably, the width, as seen in the direction of travel, of the operation surface comprising the angled surfaces is rather short, e.g. in the range of from 0.2 to 4 mm, preferably in the range of from 0.4 to 3 mm, more preferably in the range of from 0.6 to 2 mm, most preferably in the range of from 0.8 to 1.5 mm. Correspondingly, it is also preferred that the width, as seen in the direction of travel, of the opposite operation surface, i.e. at the opposite side of the tubular web, is rather short, e.g. in the range of from 0.2 to 4 mm, preferably in the range of from 0.4 to 3 mm, more preferably in the range of from 0.6 to 2 mm, most preferably in the range of from 0.8 to 1.5 mm. Since the zone, from which the filling material is moved in step b1), is rather narrow, the filling material only has to be moved a short distance. This is facilitated by the above-mentioned narrow transverse seals obtained by ultrasonic welding.

The zone, from which the filling material is moved in step b1) corresponds to a welding zone comprised in the angled surface. The width of the welding zone, as seen in the direction of travel, is a percentage of the width of the angled surface and depends on characteristics of the welding unit, the packaging material and their interaction. Examples of welding unit characteristics are angles of the operation surfaces relative to each other, distance between the operation surfaces material properties of the anvil and the sonotrode, frequency and energy of the ultra sound of the sonotrode. Examples of packaging material characteristics are type of material, melting point, thickness, surface roughness. Examples of interaction characteristics are gap width in relation to thickness of packaging material and pressure used by the anvil and the sonotrode during cutting and welding.

The method may further comprise
c) cutting the tubular web in a welded area of the transverse seal.

Preferably step c) is performed while performing step b), such that welding and cutting are performed simultaneously. If performing the above-described steps b1) and b2), the cutting is preferably performed during step b2), such that welding, pressing and cutting are performed simultaneously.

If utilizing the above-mentioned single welding unit, cutting and welding may be performed simultaneously. Further, the cutting is preferably performed such that a transverse cut is located in a welded area of the transverse seal. There is thus no interspace between the welded area and the actual cut, as could have been the case if the cutting would have been done with a separate blade or knife. There are further no non-welded portions of the tubular web adjacent to the cut. In other words, the seal will be coterminous with the cut transverse edge of the packaging material. The transverse cutting and welding are thereby made simultaneously in time, in the same operation step and geometrically next to each other.

The transverse welding unit may be displaced in a reciprocating way, e.g. at least one of the sonotrode or the anvil may be adapted to be displaced in a reciprocating way in relation to the other of the sonotrode or the anvil and thus to the tubular web, preferably each of the sonotrode and the anvil being adapted to be displaced in opposite reciprocating directions. This may be utilized when making the transverse seal, such that sealing occurs with the gap closed around the tubular web. The gap is then temporarily enlarged allowing the tubular web to pass in a temporarily larger gap until it is time for the next transverse seal.

The welding, and also the optional cutting, may be performed for a travelling web, preferably with the travelling at a constant speed.

As an alternative, the anvil and/or the sonotrode of the transverse welding unit may be rotatable, such that the circumferential speed is the same as that of the advancing tubular web. The anvil and/or the sonotrode may then comprise a rotary disc, comprising operations surfaces as described herein at its circumferential surface, e.g. such that the same operation surface can cut and weld.

In addition, or as a complement, the transverse welding unit, e.g. the sonotrode and/or the anvil, may be displaced in the direction of travel together with the tubular web while performing the transverse sealing and cutting.

In that case, it is preferred that the sonotrode and the anvil of the transverse welding unit combine the reciprocating movement and the movement of the displacement along the direction of travel together with the tubular web while performing the transverse sealing and cutting, such that the sonotrode and the anvil are moved in a respective rectangular path. A first portion of the path is parallel to and adjacent to the tubular web and represents forming the transverse seal, a second portion moves the sonotrode and the anvil, respectively, away from the tubular web, a third portion brings the sonotrode and the anvil, respectively, back upstream and a fourth portion brings the sonotrode and the anvil, respectively, into contact with the tubular web again to form the next transverse seal.

As an alternative, or a complement, to performing the welding, and also the optional 35 cutting, for a travelling web, a magazine may be provided upstream of the transverse welding unit, thereby allowing the transverse welding unit to operate on a temporarily still-standing web.

The method may further comprise pulling the tubular web at least in the direction of travel, the pulling being performed downstream of the transverse welding and cutting, preferably at a distance from the transverse welding and cutting corresponding to the extension of the portion-packed oral pouched snuff product in the direction of travel. The pulling may be performed by a pulling unit, which may comprise a nip between a pair of rollers arranged to pull the pouched product in the direction of travel.

Step a) may comprise
a1) supplying and advancing at least one web of the packaging in the direction of travel,
a2) supplying the continuous feed of filling material to the at least one advancing web of packaging material,
a3) arranging the at least one advancing web of packaging material to envelop the continuous feed of filling material, thereby forming the tubular web of packaging material enveloping the continuous feed of filling material.

As an option, step a2) may comprise supplying a plurality of continuous feeds of filling material in parallel to each other to the at least one advancing web of packaging material.

One, two, three, four or more parallel feeds of filling material may be utilized. Each of the feeds of filling material is then longitudinally enveloped by the packaging material in a respective tubular web. Preferably, the feeds of filling material are positioned in parallel and next to each other in such a way that a common longitudinal seal may be used. The longitudinal sealing is further described below.

Step a3) may comprise
longitudinally folding the at least one web of packaging material to envelop the continuous feed of filling material, or
supplying an additional web of packaging material to envelop the continuous feed of filling material.

The terms folding and fold as used herein refer to that the packaging material is curved such that it changes direction by substantially 180°. There is typically no sharp folding line but rather a curvature, wherein the packaging material follows the shape of the filling material.

Step a3) may be performed before or after step a2).

If step a2) is performed before step a3), the continuous feed of filling material may be placed on the at least one web of packaging material being in a planar state, e.g. horizontal. Thereafter the at least one web of packaging material is arranged to envelop the continuous feed of filling material.

If step a3) is performed before step a2), the continuous feed of filling material may be filled into an already formed tubular web. In that case, also the longitudinal sealing described below, may be performed before step a2), such that the web of packaging material is already longitudinally sealed, and optionally longitudinally cut, when the filling material is supplied.

As an alternative, the web of packaging material may be supplied as a pre-formed tubular web, meaning that step a3) has been performed earlier or that the web of packaging material was formed as a tubular shape during manufacturing.

The method may further comprise
a4) forming at least one longitudinal seal in the tubular web.

The longitudinal seal extends along the direction of travel coinciding with the longitudinal 25 direction of the web to longitudinally envelop the continuous feed of filling material. The at least one longitudinal seal is formed in the tubular web outside of the continuous feed of filling material to longitudinally envelop the continuous feed of filling material. A respective longitudinal seal may be located at opposite lateral sides of the continuous feed of filling material. It would also be possible that the web of packaging material is longitudinally 30 folded at one lateral side of the continuous feed of filling material and a single longitudinal seal is provided at the opposite lateral side of the continuous feed of filling material. Another alternative would be to wrap the web of packaging material around the continuous feed of filling material and to place the longitudinal seal at an arbitrary position in relation to the continuous feed of filling material, e.g. on top of it. If the web of packaging material instead is supplied as a pre-formed tube, the step of longitudinal sealing may be omitted.

The longitudinal seal is preferably provided by welding, more preferably by ultrasonic welding, even if heat-melt welding also would be feasible.

The method may further comprise longitudinally cutting the tubular web. Preferably the longitudinal cutting is performed in or at the longitudinal seal. More preferably, the longitudinal cutting is performed in or at the longitudinal seal while forming the longitudinal seal, such that cutting and welding is performed simultaneously in a corresponding way as described above for the transverse seal. The longitudinal cutting is then preferably performed such that a longitudinal cut is located in a welded area of the longitudinal seal or at the edge of the longitudinal seal, if the packaging material outside the longitudinal is to be disposed of. There would thus be no interspace between the welded area and the actual cut, as could have been the case if the cutting would have been done with a separate blade or knife. In other words, the seal will be coterminous with the cut longitudinal edge of the packaging material. The longitudinal cutting and welding would thereby be made simultaneously in time, in the same operation step and geometrically next to each other.

Longitudinal sealing and longitudinal cutting may be performed before or after transverse sealing and transverse cutting.

Longitudinal sealing and longitudinal cutting may be performed as two separate steps. In that case the longitudinal sealing may be made before the transverse sealing and cutting, and the longitudinal cutting may be made after the transverse sealing and cutting.

The method may further comprise ascertaining the width of the web of packaging material, e.g. by means of grip chains or cords holding the longitudinal edges of the web of packaging material in the transverse direction. In that case, the transverse sealing and cutting may preferably be made upstream of the longitudinal sealing and cutting.

The present invention also relates to an arrangement for portion-packing of an oral pouched snuff product. The arrangement comprises one or more supply units for 35 supplying and advancing a tubular web of packaging material enveloping a continuous feed of filling material in a direction of travel and an ultrasonic welding unit for forming transverse seals in the tubular web across the continuous feed of filling material.

The arrangement is suitable for performing the method described herein. A welding unit may also be called a sealing device.

The ultrasonic welding unit may comprise a cutting edge and be configured to perform simultaneous transverse welding and cutting of the tubular web, preferably the welding unit comprising a single operation surface performing both the transverse welding and cutting. The cutting edge provides the cutting, while one or more welding surfaces provide the welding. Hence, cutting is not performed by a knife or a blade, which may be separate or integrated in the anvil and/or the sonotrode, as is known from prior art. The cut is placed in the welded area, such that a cut may be provided having no interspace to the welded portions of the packaging material, i.e. there are no non-welded portions adjacent to the cut. In other words, the transverse seal will be coterminous with the cut edge of the packaging material. The cutting and welding is thereby made simultaneously in time, in the same operation step and geometrically next to each other.

In order to help separating the tubular web in the transverse cut, the arrangement may further comprise a pulling unit, e.g. a nip between a pair of rollers arranged to pull the pouched product in the direction of travel. Thereby the tubular web is tensioned in a controllable way in order to make a separation of one pouched product from the next pouched product easier. The distance between the nip and the cutting edge preferably roughly corresponds to the extension of the pouched product in the direction of travel. Hence, if the arrangement is utilized for manufacturing portion-packed oral pouched snuff products of different sizes, the distance is preferably adjustable.

The at least one supply unit may comprise a first feeding unit for supplying and advancing at least one web of the packaging material in the direction of travel, a second feeding unit for supplying the continuous feed of filling material to the at least one advancing web of the packaging material and a tubular forming unit for arranging the advancing web of packaging material to form the tubular web of packaging material, wherein the tubular forming unit is located before or after the second feeding unit.

The tubular forming unit may comprise or be constituted by a folding unit for longitudinally folding the at least one web of packaging material.

The tubular forming unit may comprise or be constituted by a third feeding unit for supplying an additional web of packaging material.

The arrangement may further comprise at least one longitudinal welding unit for forming a longitudinal seal in the at least one web of packaging material. The longitudinal welding unit is preferably an ultra-sonic welding unit. Heat-melt welding would also be feasible.

The longitudinal welding unit may comprise a cutting edge and be configured to perform simultaneous longitudinal welding and cutting of the tubular web, preferably the longitudinal welding unit comprising a single operation surface performing both welding and cutting. The simultaneous longitudinal welding and cutting is described above.

The longitudinal welding unit may comprises a first and a second welding component, e.g. a sonotrode and an anvil if the longitudinal welding unit is an ultrasonic welding unit, located at opposite sides of the tubular web to form a gap, through which the tubular web is arranged to pass. Each of the first and a second welding component has an end, e.g. an operation surface, which faces a planar extension of the tubular web. At least one of the ends has a curvature as seen in the direction of travel of the tubular web. The radius of curvature may be in the range of 4-80 mm, preferably in the range of 5-50 mm, more preferably in the range of 6-25 mm.

At least one of the first and second welding components may be inclined in relation to the planar extension of the tubular web with an angle being in the range of 60°-90°, preferably 70°-90°, more preferably 75°-85°. Thereby is easier to come close enough to the tubular web with the welding surface, if two longitudinal seals are made, which are close to each other. As an alternative, or a complement, it would also be possible to place one longitudinal welding unit after the other along the direction of travel.

The above-mentioned radius of curvature is suitable for stationary longitudinal welding units, since it reduces, or preferably avoids, the risk of the web getting stuck in the longitudinal welding unit.

As an alternative, the anvil and/or the sonotrode of the longitudinal welding unit may be rotatable, such that the circumferential speed is the same as that of the web. The anvil and/or the sonotrode may then comprise a rotary disc, such that the circumferential surface comprises or constitutes operations surfaces corresponding to those described above, e.g. such that the same operation surface can cut and weld.

The second feeding unit may adapted for supplying a plurality of continuous feeds of filling material parallel to each other to the at least one advancing web of packaging material. They may be fed from separate feeders or form a common feeder.

In case a plurality of continuous feeds of filling material are supplied parallel to each other, a plurality of longitudinal welding units for forming longitudinal seals may be arranged. At least one of them may comprise a single operation surface with a cutting edge arranged between a first and a second welding surface, such that the cut is positioned in a longitudinally welded zone, such that there is a longitudinal seal on each lateral side of the cutting element.

The arrangement may comprise a belt with vacuum holes. The vacuum holes are located below the intended position of the continuous feed of filling material. The vacuum is used to keep the filling material in place and thus also to keep the web of packaging material, on which the filling material is placed, in the desired position. The belt is used to advance the web. In that case, the transverse sealing and cutting may preferably be performed downstream of the longitudinal sealing and cutting.

The method and/or the arrangement as described herein are suitable for high-speed portion-packing of oral pouched snuff products, such as production speeds providing at least 100 pouched products per minute, or at least 150 pouched products per minute, or at least 200 pouched products per minute.

The method and/or the arrangement as described herein may be utilized to provide an oral pouched snuff product comprising a filling material and a saliva-permeable pouch enclosing the filling material, the saliva-permeable pouch having a longitudinal direction and a transverse direction perpendicular to said longitudinal direction; the saliva-permeable pouch having at least one elongated seal having a seal length extending along said transverse direction of said product and a seal width extending along the longitudinal direction of the saliva-permeable pouch, wherein the seal width of said at least one elongated seal is equal to or less than 2 mm, such as within the range of from 0.1 mm to 2 mm or from 0.1 mm to 1 mm or from 0.1 mm to 0.5 mm, and the at least one elongated seal sealing an outermost end portion of the saliva-permeable pouch.

The method and/or the arrangement as described herein are suitable to be utilized for applications in which the packaging material is elastic in at least one direction or in one direction. The packaging material may be a textile material, e.g. a knitted material, such as a warp-knitted material. The packaging material may comprise of or consist of fibres of thermoplastic polyamide, such as polyamide 6.

The packaging material may have an elongation at break of at least 150%, in particular at least 200% or even at least 250% in the elastic direction, as measured according to standard test method WSP 110.4(05).

The packaging material may be elastic in one direction only. This implies that the packaging material is rather stiff in another direction being perpendicular to the direction, in which the material is elastic. Typically the directions are chosen such that the rather stiff direction coincides with the machine direction of the arrangement for portion-packing of the oral pouched snuff product.

The packaging material of the saliva-permeable pouch typically has a first direction and a second direction, the second direction being perpendicular to the first direction. Typically the first direction corresponds to the machine direction, MD, of the packaging material and the second direction corresponds to the cross direction, CD, of the packaging material.

The elongation at break may, as measured according to standard test method WSP 110.4(05), be at least 5 times higher in the second direction than in the first direction, preferably at least 6 times higher, more preferably at least 7 times higher, most preferably at least 8 times higher or preferably at least 9 times higher.

BRIEF DESCRIPTION OF THE DRAWINGS

The present invention will hereinafter be further explained by means of non-limiting examples with reference to the appended drawings wherein:

FIG. 1a-b illustrate a portion packet of an oral pouched snuff product,

FIG. 2a-b illustrate a portion packet of another oral pouched snuff product,

Figure 3:
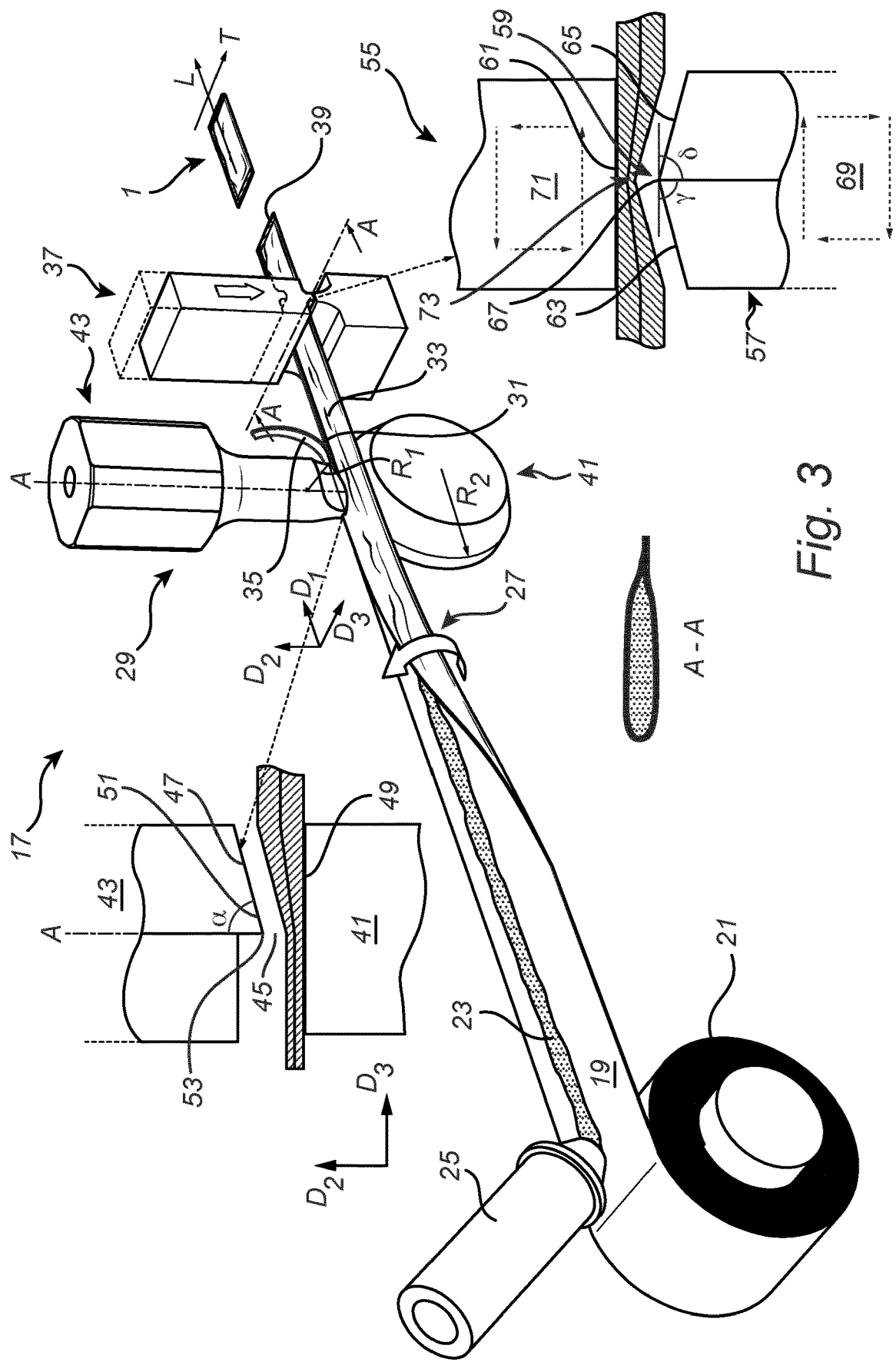
FIG. 3 illustrates portion-packing of an oral pouched snuff product according to a first embodiment of the invention.

It should be noted that the appended drawings are not necessarily drawn to scale and that the dimensions of some features of the present invention may have been exaggerated for the sake of clarity.

DETAILED DESCRIPTION

The invention will, in the following, be exemplified by embodiments. It should however be realized that the embodiments are included in order to explain principles of the invention and not to limit the scope of the invention, defined by the appended claims. Details from two or more of the embodiments may be combined with each other.

FIGS. 1a and 1b schematically illustrate a portion packet 1 of an oral pouched snuff product, which has been made according to the method and with an arrangement as described herein. The portion packet 1 comprises a portion 3 of a filling material enclosed in a packaging material 5. The filling material comprises a smokeless tobacco or tobacco-free material, which may be nicotine-containing or nicotine free. The filling material may also be referred to as filling composition or snuff composition.

The portion packet 1 has a pillow-like shape, which typically is substantially rectangular, when seen from its largest side, e.g. lying down on a table, as is illustrated in FIG. 1a. The portion packet 1 has a length l and a width w. The shape comprises two parallel short edges 7a, 7b extending in the width direction and two parallel long edges 9a, 9b, which extend in the length direction and thus are perpendicular to the short edges 7a, 7b. A respective transverse seal 11a, 11b is arranged at each of the short edges 7a, 7b. A longitudinal seal 13a is located along one of the long edges 9a, while there is a fold 15 along the other of the long edges 9b. The term fold as used herein refers to that the packaging material is curved such that it changes direction by substantially 180°. There is typically no sharp folding line in the fold 15, but rather a curvature wherein the packaging material follows the shape of the portion 3 of filling material, as is seen in FIG. 1b. The portion 3 of the filling material is completely enclosed by the three seals 11a, 11b, 13a and the fold 15.

FIGS. 2a and 2b schematically illustrate another portion packet 1' of an oral pouched snuff product, which has been made according to the method and with an arrangement as described herein. The portion packet 1' comprises a portion 3' of a filling material enclosed in packaging material 5'. The portion packet 1' of FIGS. 2a and 2b differs from that of FIGS. 1a and 1b in that there is a longitudinal seal 13a', 13b' at each of the long edges 9a', 9b'. The portion 3' of the filling material is thus completely enclosed by the four seals 11a', 11b', 13a', 13b' sealing the packaging material.

By the term "tobacco" as used herein is meant any part, e.g. leaves, stems, and stalks, of any member of the genus *Nicotiana*. The tobacco may be whole, shredded, threshed, cut, ground, cured, aged, fermented, or treated otherwise, e.g., granulated or encapsulated.

The term "tobacco material" is used herein for tobacco leaves or parts of leaves, such as lamina and stem. The leaves and parts of leaves may be finely divided (disintegrated), such as ground, cut, shredded or threshed, and the parts of leaves may be blended in defined proportions in the tobacco material.

"Oral" and "oral use" is in all contexts used herein as a description for use in the oral cavity of a human, such as buccal placement.

The term "oral pouched snuff products" as used herein includes oral pouched non-tobacco snuff products, which may be nicotine-containing or nicotine-free, as well as oral pouched tobacco snuff products, also called oral pouched smokeless tobacco products.

As used herein the terms "pouched snuff product for oral use" or "oral pouched snuff product" refer to a portion of smokeless tobacco or tobacco-free filling material, which may be nicotine-containing or nicotine free, packed in a saliva-permeable packaging material intended for oral use.

FIG. 3 schematically illustrates a method and an arrangement 17 for portion-packing of an oral pouched snuff product 1 according to a first embodiment of the invention. A web 19 of the packaging material is supplied, e.g. from a roll being part of a first feeding unit 21, and is advanced through the arrangement 17 in a direction of travel, which coincides with a longitudinal direction L of the web 19. The web 19 has a planar extension when supplied from the first feeding unit 21. A continuous feed 23 of filling material, e.g. snuff, is supplied to the advancing web 19 of packaging material from a second feeding unit 25, such that the continuous feed 23 of filling material is positioned on top of the planar web 19.

The arrangement 17 further comprises a belt with vacuum holes, not illustrated. The vacuum holes are located below the intended position of the continuous feed 23 of filling material. The vacuum is used to keep the filling material in place and thus also to keep the web 19 of packaging material, on which the filling material is placed, in the desired position. The belt is used to advance the web 19.

Further downstream, the web 19 is longitudinally folded along the direction of travel L in a folding unit 27, such that a portion of the web 19, e.g. half of its width, is positioned on top of the continuous feed 23 of filling material, thereby forming two plies of packaging material, which are to be attached to each other by welding. Thereby a tubular web 33 is formed, which envelops the continuous feed 23 of filling material in the direction of travel. The first feeding unit 21, the second feeding unit 25 and the folding unit 27 together form a supply unit for forming the tubular web 33.

Subsequently, the web 19 is longitudinally sealed, i.e. sealed in the longitudinal direction, by means of a longitudinal welding unit 29 forming a longitudinal seal 31. Thereby the tubular web 33 enveloping the continuous feed 23 of filling material is provided with the longitudinal seal 31 extending in the direction of travel of the web 19. The continuous feed 23 of filling material has the fold of the web 19 at one of its lateral sides and the longitudinal seal 31 at the opposite lateral side, cf. the fold 15 and the longitudinal seal 13a in FIGS. 1a and 1b. The longitudinal welding unit 29 is further described below.

The tubular web 33 is cut in the longitudinal direction L in order to remove packaging material located outside of the longitudinal seal 31, i.e. on the lateral side of the longitudinal seal free from filling material. This undesired packaging material may be cut away, e.g. as strips 35, and disposed of. Hence, it is enough to weld on only one side of the longitudinal cut in the arrangement according 17 to the first embodiment. In the illustrated embodiment, cutting and welding are both performed by the longitudinal welding unit 29 and hence performed simultaneously, but it would also be feasible to have a separate longitudinal cutting unit downstream of the longitudinal welding unit 29.

As a next step, the tubular web 33 is transversally sealed by an ultrasonic welding unit 37, which forms a transverse seal 39 extending in a transverse direction T being perpendicular to the longitudinal direction L and thus to the direction of travel. During or after transverse welding, the tubular web 33 is cut in the transverse direction T. In the illustrated embodiment, cutting and welding are both performed by the ultrasonic welding unit 37. This will result in a portion packet 1 with the three seals 11a, 11b, 13a and the fold 15 described above in conjunction with FIGS. 1a and 1b. The ultrasonic welding unit 37 for transverse sealing is also further described below.

Figure 4:
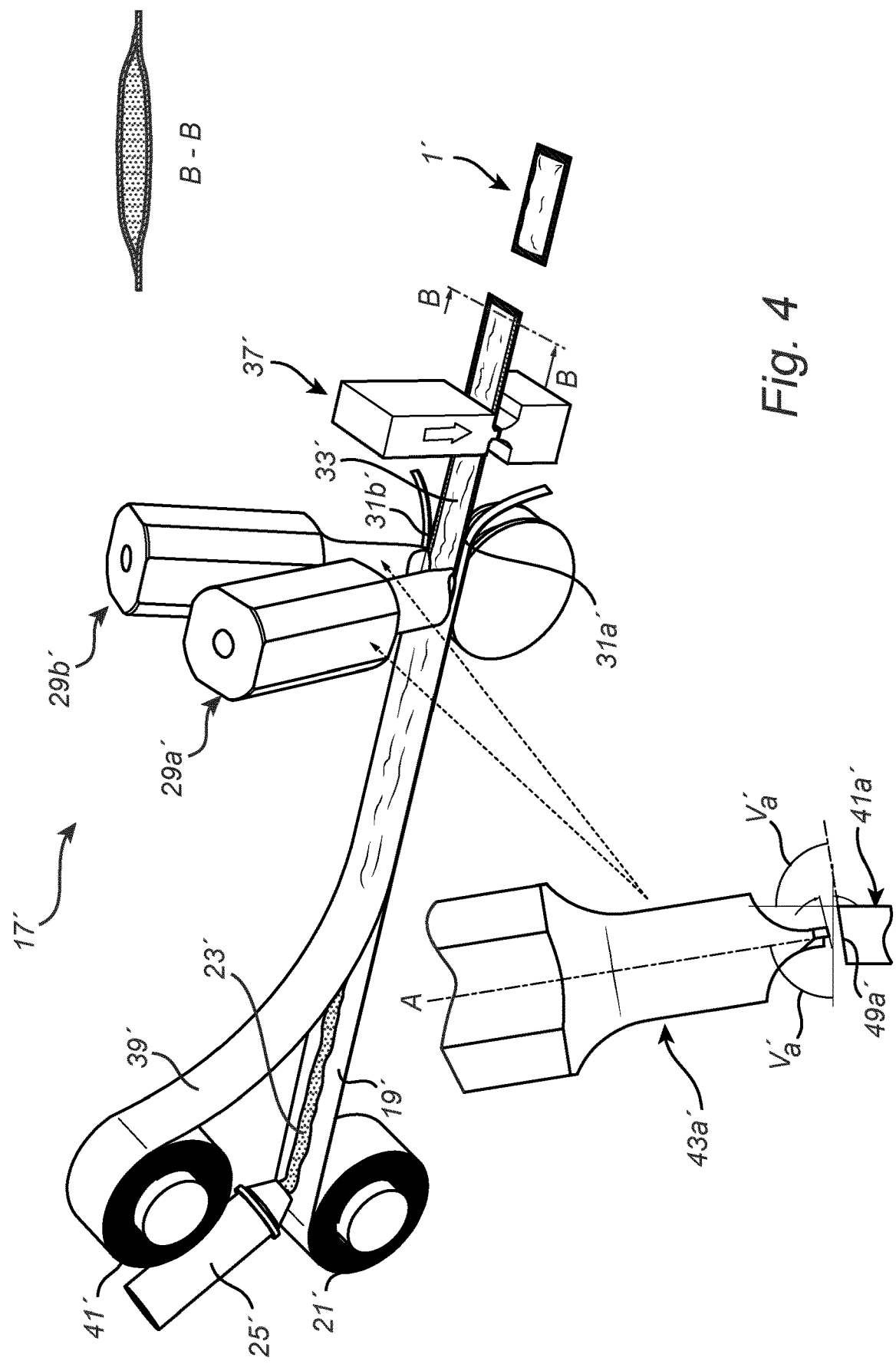
FIG. 4 illustrates portion-packing of an oral pouched snuff product according to a second embodiment of the invention.

FIG. 4 schematically illustrates a method and an arrangement 17' for portion-packing of an oral pouched snuff product according to a second embodiment of the invention. A web 19' of the packaging material is supplied, e.g. from a roll being part of a first feeding unit 21', and advanced through the arrangement 17' in the direction of travel. A continuous feed 23' of filling material is supplied to the advancing web 19' of packaging material from a second feeding unit 25' and positioned on top of the web 19'. Thereafter, an additional web 39' of the same or another packaging material is supplied from a third feeding unit 41' and positioned on top of the continuous feed 23' of filling material.

The web 19' and the additional web 39' are thereafter longitudinally sealed to each other at either lateral side of the continuous feed 23' of filling material by means of longitudinal welding units 29a', 29b' forming longitudinal seals 31a', 31b'. Hence a tubular web 33' enveloping the continuous feed 23' of filling material is provided with the longitudinal seals 31a', 31b', extending in the direction of travel. The continuous feed 23' of filling material has a first longitudinal seal 31a' at one lateral side and a second longitudinal seal 31b' at the opposite lateral side, cf. the longitudinal seals 13a', 13b' in FIGS. 2a and 2b. The longitudinal welding units 29a', 29b' are further described below.

Thereafter, the tubular web 33' is transversally sealed and cut by an ultrasonic welding unit 37' in a corresponding way as described for FIG. 3. This will result in a portion packet 1', having four seals 11a', 11b', 13a', 13b', as is described above in conjunction with FIGS. 2a and 2b.

Figure 5:
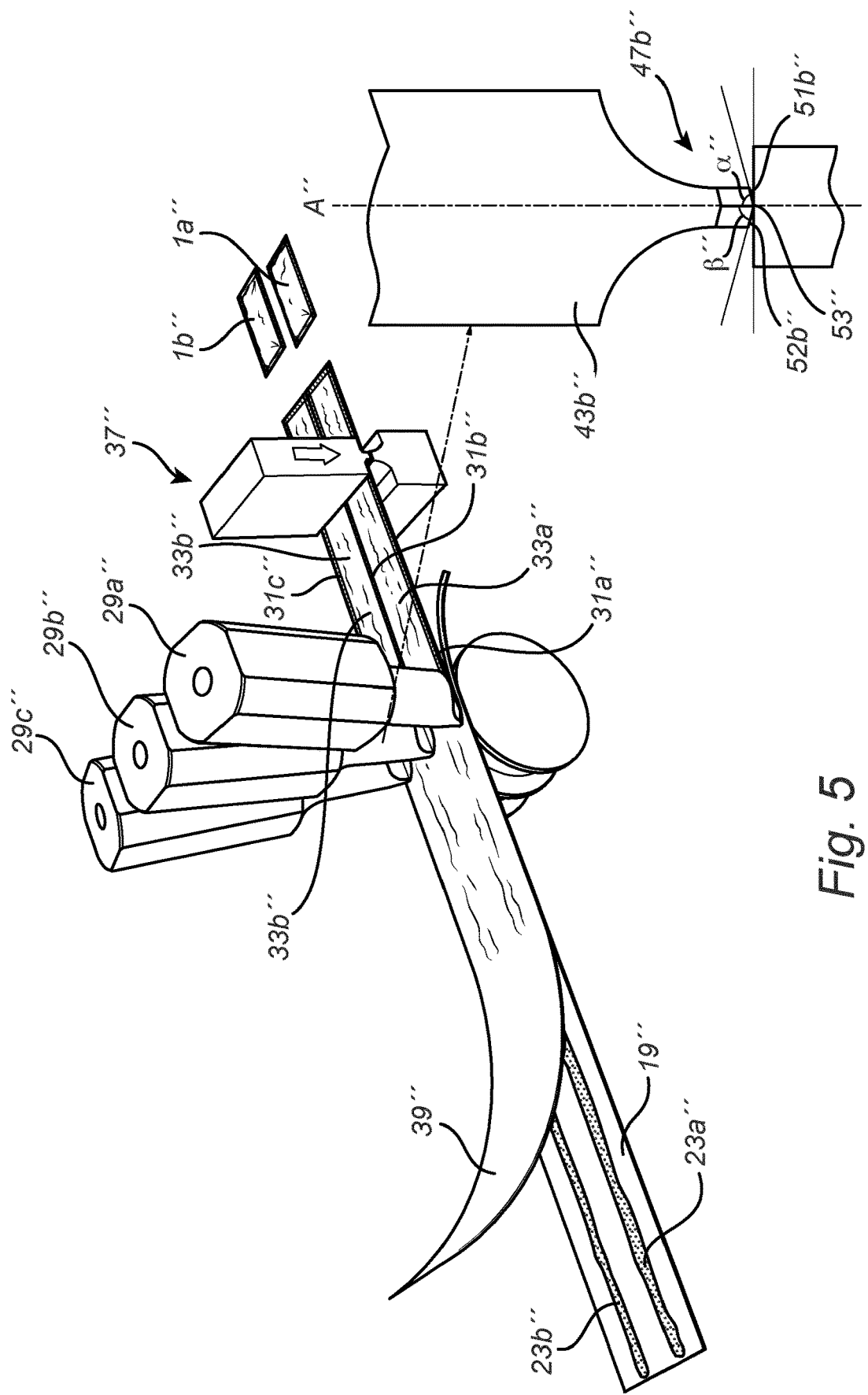
FIG. 5 illustrates portion-packing of an oral pouched snuff product according to a third embodiment of the invention.

FIG. 5 schematically illustrates a method and an arrangement 17" for portion-packing of an oral pouched snuff product according to a third embodiment of the invention. It has most features in common with the second embodiment of FIG. 4, but the FIG. 5 embodiment differs in that the web 19" of packaging material is wide enough to make a plurality of pouched snuff products parallel to each other. The illustrated example shows two pouched snuff product being made in parallel, but it would also be feasible to make three, four, five, six or more snuff products in parallel.

A plurality of continuous feeds of filling material 23a", 23b", here two, are supplied parallel to each other to the web 19" of packaging material. Correspondingly as for FIG. 4, an additional web 39" is positioned on top of the continuous feeds 23a", 23b" of filling material. Thereafter the web 19" and the additional web 39" are welded to each other at both lateral sides of the respective continuous feeds 23a", 23b" of filling material by means of a first 29a", a second 29b" and a third 29c" longitudinal welding unit, such that longitudinal seals 31a", 31b", 31c" are formed along the continuous feeds 23a", 23b" of filling material. The first and third welding units 29a" and 29c" are similar to those of the 20 second embodiment and thus arranged to form the longitudinal seals 31a" and 31c" and to cut the undesired packaging material away as strips, while the second welding unit 29b" is arranged to form the longitudinal seal 31b" in between the continuous feeds 23a", 23b" of filling material. After longitudinal sealing, the continuous feeds 23a", 23b" of filling material are each longitudinally enveloped by the three longitudinal seals 31a", 31b", 31c", such that two tubular webs 33a", 33b" are formed.

Subsequently, the tubular webs 33a", 33b" are transversally sealed and cut by an ultra-sonic welding unit 37" in a corresponding way as for FIG. 3. There may be one ultrasonic welding unit for each tubular web 33a", 33b" or there may be a common ultrasonic welding unit 37" for both webs as is illustrated. This will result in portion packet 1a", 1b" having four seals 11a', 11b', 13a', 13b', as is described above in conjunction with FIGS. 2a and 2b.

The longitudinal welding units 29, 29a', 29b', 29a", 29b", 29c" illustrated in FIGS. 3-5 comprise a first and a second welding component located at opposite sides of the tubular web 33, 33', 33" to form a gap, through which the tubular web 33, 33', 33" is arranged to pass. The welding units may also be called sealing devices.

In the illustrated embodiments, the longitudinal sealing is made by means of ultrasonic welding. Hence, the first welding component is a sonotrode and the second welding component is an anvil. Further, the longitudinal welding units 29, 29a', 29b', 29a", 29b", 29c" combine welding and cutting. The cutting and welding is thereby made simultaneously in time, in the same operation step and geometrically next to each other.

The longitudinal welding unit 29 of the first embodiment of FIG. 3 is suitable for making the longitudinal seal 31 of FIG. 3, the longitudinal seals 31a' and 31b' of FIG. 4 and the outer longitudinal seals 31a", 31c" of FIG. 5, wherein packaging material located outside of the longitudinal seal, i.e. on the lateral side of the seal where there is no filling material, is to be cut away, e.g. as strips 35, and disposed of. Hence, it is enough to weld on only one side of the cut.

The longitudinal welding unit 29 comprises an anvil 41 and a sonotrode 43, see FIG. 3. The sonotrode 43 is adapted for transmitting ultra-sonic energy and is arranged opposite to the anvil 41 to allow passage of the tubular web 33 in a gap 45 formed between the sonotrode 43 and the anvil 41. The anvil 41 and the sonotrode 43 are configured for simultaneous welding and cutting of the packaging material. The welding operation is utilized to provide the tubular web 33 with one or more longitudinal seal 31. The cutting operation is utilized to cut the packaging material, e.g. to separate superfluous packaging material from the longitudinal seal as strips 35. The tubular web 33 is adapted to be advanced in the direction of travel L through the gap 45, while the anvil 41 and the sonotrode 43 in the illustrated embodiment are stationary.

The sonotrode 43 comprises a first operation surface 47 and the anvil 41 comprises a second operation surface 49, which is located opposite to the first operation surface 47. The first operation surface 47 forms an end of the sonotrode 43 facing a planar extension of the tubular web 33, here from above. The second operation surface 49 forms an end of the anvil 41 facing the planar extension of the tubular web 33 from the other side of the tubular web 33, here from below.

The first operation surface 47 of the sonotrode 43 comprises a welding surface 51 and a cutting edge 53 delimiting an edge of the welding surface 51. The cutting edge 53 is located at a portion of the first operation surface 47 being adjacent to the narrowest portion of the gap 45. The cutting edge 53 is adapted to cut through the packaging material. The second operation surface 49 is flat and substantially parallel to the planar extension of the tubular web 33. The welding unit 29 may also be configured the other way around, such that the first operation surface with the cutting edge is comprised in the anvil and the second operation surface in the sonotrode, or there may be a cutting edge in both the anvil and the sonotrode.

The extension direction of the cutting edge 53 defines a first direction $D_1$ of the sonotrode 43. Since the welding unit 29 is adapted to provide a longitudinal seal 33, the first direction $D_1$ substantially coincides with the direction of travel, i.e. the longitudinal direction L of the web 19. A main direction A of the sonotrode 43 defines a second direction $D_2$, which is perpendicular to the first direction $D_1$. A third direction $D_3$ is perpendicular to both the first direction $D_1$ and to the second direction $D_2$ and extends in the transverse direction T of the web 19.

The welding surface 51 assumes an angle α being between 60° and 90° in relation to the main direction A of the sonotrode 43, being parallel to the second direction $D_2$, preferably the angle α being in the range from 65° to 85°, more preferably from 70° to 80°, most preferably from 73° to 78°. In the illustrated embodiment, the angle α is substantially 75°. The welding surface 51 extends all the way to the cutting edge 53, such that there is no interspace between the weld and the cut, i.e. there are no non-welded portions adjacent to the cut. As mentioned above, the second operation surface 49 is non-angled. It thus assumes an angle of 90° in relation to the second direction $D_2$.

The welding surface 51 comprises a welding zone delimited at one side by the cutting edge 53, in which zone the anvil 41 and the sonotrode 43 are close enough to be able to at least partly melt the two plies of the packaging material and thereby join them by welding. The width of the welding zone in the third direction $D_3$ is a portion of the width of the welding surface 51 and depends on characteristics of the welding unit, the packaging material and their interaction. Examples of device characteristics are angles of the operation surfaces 47, 49 relative to each other, distance between the operation surfaces 47, 49, material properties of the anvil 41 and the sonotrode 43, frequency and energy of the ultrasound of the sonotrode 43. Examples of packaging material characteristics are type of material, melting point, thickness, surface roughness. Examples of interaction characteristics are gap width in relation to thickness of packaging material and pressure used by the anvil 41 and the sonotrode 43 during cutting and welding.

In order to reduce, or preferably avoid, the risk of the web 19 getting stuck in the longitudinal welding unit 29, the sonotrode 43 and/or the anvil 41 may have a curvature extending in the first direction $D_1$ coinciding with the direction of travel of the web 19. Hence, the first and second operation surfaces 47, 49 are rounded as seen in the direction of travel. The welding surface 51 and the cutting edge 53 of the first operation surface 47 are thus curved. The cutting edge 53 has a first radius of curvature $R_1$ being in the range of 4-80 mm, preferably in the range of 5-50 mm, more preferably in the range of 6-25 mm, e.g. about 10 mm. The curvature of the welding surface 51 is adapted to that of the cutting edge 53.

As regards the anvil 41, a main body of the anvil 41 has a disc shape with a circular cross-section. At the second operation surface 49 there is a second radius of curvature $R_2$ being in the range of 4-80 mm, preferably in the range of 5-50 mm, more preferably in the range of 6-25 mm, e.g. about 15 mm. In the illustrated embodiment the anvil 41 is stationary when performing welding and cutting. However, the anvil 41 is rotatable and may be rotated when the longitudinal welding unit 29 is not in use for welding. The anvil 41 may then be rotated a few degrees such that another portion of its circumference faces the sonotrode 43. Thereby the wear of the second operation surface 49 may be distributed over the circumference of the anvil 41. In addition, the second radius of curvature $R_2$ contributes to the desired effect of reducing, or preferably avoiding, the risk of the web 19 getting stuck in the longitudinal welding unit 29. In the illustrated embodiment, wherein the anvil has a circular cross-section, the main direction is defined as a diameter being directed towards the sonotrode 43.

The longitudinal welding units 29a', 29b' of the second embodiment and the first and third longitudinal welding units 29a", 29c" of the third embodiment, i.e. the outer longitudinal welding units have most features in common with that of the first embodiment. Hence, they only weld on one side of the cut.

However, there is a difference between the sonotrodes of the second embodiment and the sonotrode 43 of the first embodiment: In order to come close enough to the tubular web with the welding surface, the sonotrode 43a' is inclined by an angle $v_a'$ in relation to the planar extension of the tubular web 33'. The angle $v_a'$ is in the range of 60°-90°, preferably 70°-90°, more preferably 75°-85°. The angle 90° corresponds to the orientation of the welding unit 29 in FIG. 3, i.e. a vertical orientation. The other sonotrode 43b' is also inclined in relation to the planar extension of the tubular web 33". The angle is in the range of 60°-90°, preferably 70°-90°, more preferably 75°-85°. Typically the inclination angles have the same size but are inclined in opposite directions, as is illustrated in FIGS. 4 and 5.

As a consequence, the second operation surface 49a' of the anvil 41a' is no longer parallel to the planar extension of the tubular web 33'. Instead the second operation surface 49a' is angled such that it has a relative orientation to that of the first operation surface 47a' corresponding to that of the first embodiment. As an alternative or a complement, the whole anvil 41a' may be inclined in relation to the direction of travel.

By inclining the longitudinal welding units 29a', 29b' of the second embodiment it is possible to locate them opposite to each other, such that the longitudinal seals 31a' and 31b' are made simultaneously. However, it would also be possible to use welding units like the one of FIG. 3 and place one after the other along the direction of travel.

The second longitudinal welding unit 29b" of the third embodiment is suitable for making the longitudinal seal 31b" of FIG. 5, wherein there is filling material on both sides of the seal. Hence, it is desirable to weld on both sides of the cut. A longitudinal welding unit of this type may also be used for the making the longitudinal seal 31 of FIG. 3, the longitudinal seals 33$a'$ and 33$b'$ of FIG. 4 and the outer longitudinal seals 33$a''$, 33$c''$ of FIG. 5. In that case also at least a portion of strips 35 located outside the longitudinal seal are welded to each other. The strength of the combined edge strip is higher than would be the case, if the two edge strips were removed separately, i.e. not welded to each other.

The first operation surface 47$b''$ of the sonotrode 43$b''$ comprises a first welding surface 51$b''$, a second welding surface 52$b''$ and a cutting edge 53$''$, which is located in between the welding surfaces 51$b''$, 52$b''$. Since there are welding surfaces 51$b''$, 52$b''$ on both sides of the cutting edge 53$''$, the cut will be located within the longitudinal seal 31$b''$, such that both tubular webs 31$a''$ and 31$b''$ will have a respective longitudinal seal after the longitudinal cutting has been performed.

The first welding surface 51$b''$ assumes an angle $\alpha''$ being between 60° and 90° in relation to the main direction A″ of the sonotrode 43$b''$, preferably the angle $\alpha''$ being in the range from 65° to 85°, more preferably from 70° to 80°, most preferably from 73° to 78°. In the illustrated embodiment, the angle $\alpha''$ is substantially 75°. The second welding surface 52$b''$ assumes an angle $\beta''$ being between 60° and 90° in relation to the main direction A″ of the sonotrode 43, preferably the angle $\beta''$ being in the range from 65° to 85°, more preferably from 70° to 80°, most preferably from 73° to 78°. In the illustrated embodiment, the angle $\beta''$ is substantially 75°. Preferably the angles $\alpha''$, $\beta''$ have the same size but are oriented in opposite directions. The welding surfaces 51$b''$, 52$b''$ extend all the way to the cutting edge 53$''$, such that there is no interspace between the weld and the cut, i.e. there are no non-welded portions adjacent to the cut. The second operation surface 49 of the anvil is non-angled and hence parallel to the planar extension of the web 19″. The welding surfaces 51$b''$, 52$b''$ comprise a respective welding zone corresponding to that of the sonotrode 43 of the first embodiment.

The illustrated longitudinal welding units all have the welding surfaces and the cutting edge in the sonotrode, but they may also be configured the other way around, such that the first operation surface with the cutting edge is comprised in the anvil and the second operation surface in the sonotrode or there may be a cutting edge in both the anvil and the sonotrode. Further, even if the illustrated embodiments disclose providing the longitudinal seal with ultrasonic welding, heat-melt welding would also be feasible.

As an alternative to the stationary longitudinal welding unit of the illustrated embodiments, FIG. 5, the anvil and/or the sonotrode may rotate such that the circumferential speed is the same as that of the web. The anvil and/or the sonotrode may then comprise a rotary disc, such that the circumferential surface comprises or constitutes operations surfaces corresponding to those described above, e.g. such that the same operation surface can cut and weld.

The ultrasonic welding unit 37 for transverse sealing is configured in a corresponding way for the three illustrated embodiments. A sonotrode 55 is located above the tubular web 33 and an anvil 57 is located below the tubular web 33 opposite to the sonotrode 55. The anvil 57 comprises a first operation surface 59 and the sonotrode 55 comprises a second operation surface 61, which is located opposite to the first operation surface 59.

The first operation surface 59 comprises a first welding surface 63, a second welding surface 65 and a cutting edge 67, which is located in between the welding surfaces 63, 65. Since there are welding surfaces 63, 65 on both sides of the cutting edge 67, the cut will be located within the weld. The cutting edge 67 is located at a portion of the first operation surface 59 being adjacent to the narrowest portion of the gap. The cutting edge 67 is adapted to cut through the packaging material. The second operation surface 61 is flat and substantially parallel to the planar extension of the web 19. The welding unit 37 may also be configured the other way around, such that the first operation surface with the cutting edge is comprised in the sonotrode and the second operation surface in the anvil or there may be a cutting edge in both the anvil and the sonotrode. Since the welding unit 37 is adapted to provide a transverse seal 39, the cutting edge 67 extends in the transverse direction T being perpendicular to the direction of travel.

The first welding surface 63 assumes an angle $\gamma$ being between 60° and 90° in relation to the main direction of the sonotrode 55, preferably the angle $\gamma$ being in the range from 65° to 85°, more preferably from 70° to 80°, most preferably from 73° to 78°. In the illustrated embodiment, the angle $\gamma$ is about 75°. The second welding surface 65 assumes an angle $\delta$ being between 60° and 90° in relation to the main direction B of the sonotrode 55, preferably the angle $\delta$ being in the range from 65° to 85°, more preferably from 70° to 80°, most preferably from 73° to 78°. In the illustrated embodiment, the angle $\delta$ is about 75°. Preferably the angles $\gamma$, $\delta$ have the same size but are oriented in opposite directions. The welding surfaces 63, 65 extend all the way to the cutting edge 67, such that there is no interspace between the weld and the cut, i.e. there are no non-welded portions adjacent to the cut. The welding surfaces 63, 65 comprise a respective welding zone corresponding to that of the sonotrode 43 of the first embodiment.

The transverse welding unit 37 may be displaced in a reciprocating way, e.g. at least one of the sonotrode 55 or the anvil 57 may be adapted to be displaced in a reciprocating way in relation to the other of the sonotrode 55 or the anvil 57 and thus to the tubular web 33, preferably each of the sonotrode 55 and the anvil 57 being adapted to be displaced in opposite reciprocating directions. This may be utilized when making the transverse seal, such that the transverse seal is formed with the gap closed around the tubular web 33. The gap is thereafter temporarily enlarged allowing the tubular web to pass in a temporarily larger gap until it is time for forming the next transverse seal.

In addition, or as a complement, the sonotrode 55 and the anvil 57, may be displaced in the direction of travel together with the tubular web 33 while forming the transverse seal.

It is preferred that the sonotrode 55 and the anvil 57 combine these movements, such that they are moved in a respective rectangular path 69, 71 schematically indicated in FIG. 3. A first portion of the path is parallel to and adjacent to the tubular web 33 and represents forming the transverse seal 39, a second portion moves the sonotrode 55/the anvil 57 away from the tubular web 33, a third portion brings the sonotrode 55/the anvil 57 back upstream and a fourth portion brings the sonotrode 55/the anvil 57 into contact with the tubular web 33 again to form the next transverse seal 39.

The forming of the transverse seal may comprise
b1) applying a pressure to the tubular web 33 in a zone 73 corresponding to an intended location of one of the transverse seal 39, thereby moving at least a portion of the filling material away from the zone 73, and thereafter b2) ultrasonically welding while continuing to apply pressure in the zone 73.

In step b1), the angled welding surfaces 63, 65 may be utilized to help moving the filling material away from the zone.

It is desirable that the width of the first operation surface 59 as seen in the direction of travel is rather short, e.g. in the range of from 0.2 to 4 mm, preferably in the range of from 0.4 to 3 mm, more preferably in the range of from 0.6 to 2 mm, most preferably in the range of from 0.8 to 1.5 mm. Correspondingly, it is also preferred that the width of the second operation surface 61 as seen in the direction of travel is rather short, e.g. in the range of from 0.2 to 4 mm, preferably in the range of from 0.4 to 3 mm, more preferably in the range of from 0.6 to 2 mm, most preferably in the range of from 0.8 to 1.5 mm.

The filling material, which is located in the zone 73 before the pressure is applied, is then more or less removed from the zone 73 in step b1). The filling material may be pressed 35 backwards and/or forwards as seen in the direction of travel. It may then be preferred that there is enough free space at the side of the continuous feed 23 of filling material to allow the filling material behind or in front of the transverse seal 39 to move in the transverse direction T. As an alternative or a complement, the continuous feed 23 of filling material may be loosely packed, such that it can be locally compressed when filling material is pressed away from the zone 73.

In order to help separating the tubular web 33 in the transverse cut, the arrangement 17 may further comprise a pulling unit, not illustrated, e.g. a nip between a pair of rollers arranged to pull the pouched product in the direction of travel. Thereby the tubular web 33 is tensioned in a controllable way in order to make a separation of one pouched product from the next pouched product easier. The distance between the nip and the cutting edge preferably roughly corresponds to the extension of the pouched product in the direction of travel. Hence, if the arrangement 17 is utilized for manufacturing portion-packed oral pouched snuff products of different sizes, the distance is preferably adjustable.

In order to be able to pull the pouched product 1 filled with portion 3 of the filling material without destroying the pouched product 1 in the nip, at least one of the rolls may be provided with a plurality of ridges, having interspaces between the ridges. The ridges will help to pull the pouched product 1, while the interspaces give room for the filling material. Thereby, it is possible to pull the pouched product 1 through the nip without destroying it. There are at least two ridges. The other roll of the nip may be flat or also comprise ridges.

Figure 6:
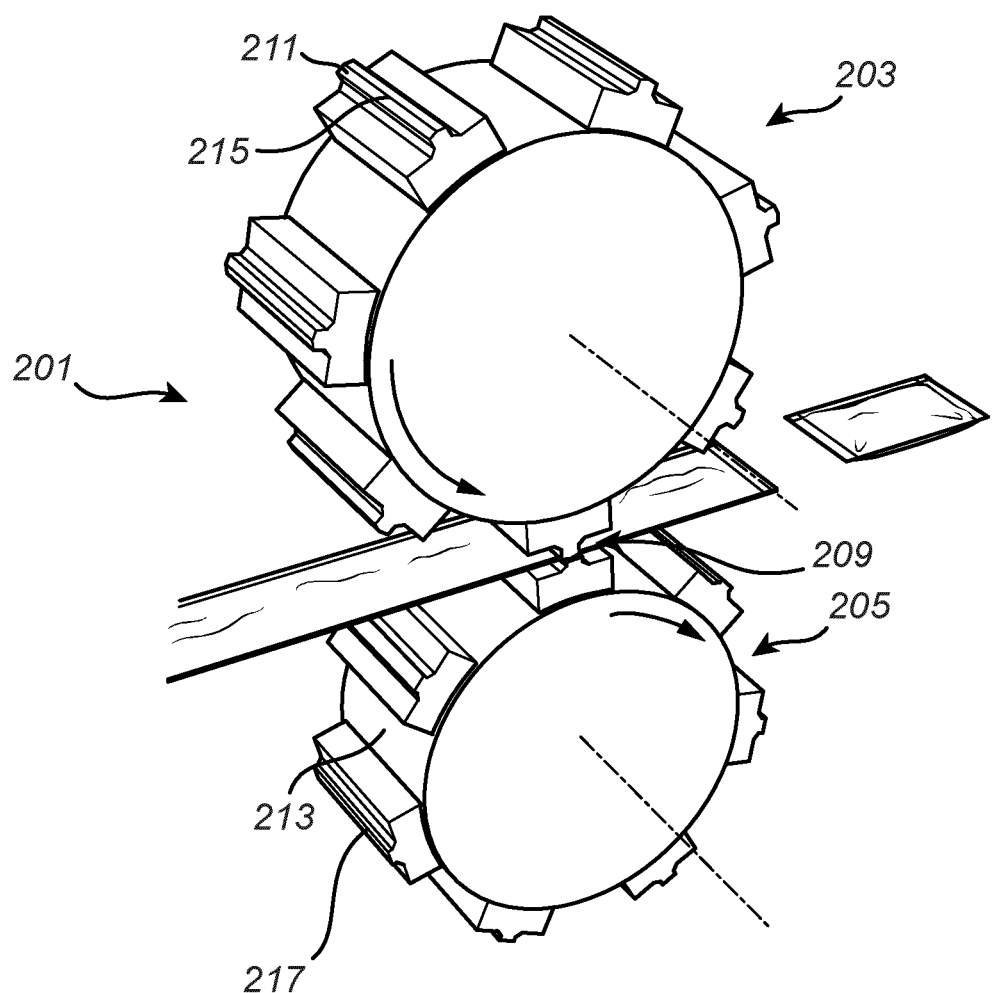
FIG. 6 illustrates an alternative ultrasonic welding unit for transverse seals.

FIG. 6 illustrates an alternative ultrasonic welding unit 201 for forming transverse seals comprising a sonotrode 203 and an anvil 205. The alternative welding unit would be useful in any of the illustrated embodiments. The sonotrode 203 comprises a rotary disc. Also the anvil 205 comprises a rotary disc. The rotary discs rotate, such that their circumferential speeds are adapted to the speed of the advancing tubular web. A gap 209 is formed between the sonotrode 203 and the anvil 205, through which gap 209 the tubular web with the enveloped filling material passes. Since the seal is to be made in a transverse direction, the operation surface 211 of the sonotrode 203 is located at the perimeter of the sonotrode 203 and extends in an axial direction of the rotary disc. The sonotrode 203 comprises one or more first operation surfaces 211, in the illustrated embodiment seven, which are evenly distributed in the circumferential direction, such that the distance between two cutting edges 215 correspond to the longitudinal extension I of the pouched product, see FIG. 1a.

Correspondingly, the second operation surfaces 217 of the anvil 205 are located at the perimeter 213 of the anvil 205 and extend in the axial direction. The second operation surfaces 217 of the anvil 205, which are similar to the one illustrated in FIG. 3 for the sonotrode 55, are evenly distributed in the circumferential direction of the anvil 205, such that the distance between two second operation surfaces 217 correspond to the longitudinal extension I of the pouched product. As an alternative embodiment, the operation surfaces comprising the cutting edges could instead be located at the anvil 205, or at both the anvil 205 and the sonotrode 203.

With the method and the arrangement described herein, the size of the pouched snuff product may be selected according to preferences. By adjusting the time between forming one transverse seal and forming the next transverse seal in relation to the speed of the tubular web 33, the distance between the transverse seal may be selected in a desired way. Hence it is easy to obtain a desired length l of the pouched product 1, 1'. By adjusting the width of the web 19, the width of the strips 35 and or the distance between the longitudinal welding units 29a', 29b', 29a", 29b", 29c", the width w of the pouched product 1, 1' may be selected in a desired way.

Even if the illustrated embodiments show that the web advances horizontally through the arrangement described herein, it is also feasible that the advancing web has another orientation, such as inclined by an angle in the range of 0°-90°, or vertical.

Further modifications of the invention within the scope of the appended claims are feasible. As such, the present invention should not be considered as limited by the embodiments and figures described herein. Rather, the full scope of the invention should be determined by the appended claims, with reference to the description and drawings.

The invention claimed is:

1. A method for portion-packing of an oral pouched snuff product, said method comprises:
   a) supplying and advancing a tubular web of packaging material enveloping a continuous feed of filling material in a direction of travel,
   b) forming transverse seals in said tubular web across said continuous feed of filling material by ultrasonic welding with an ultrasonic welding unit configured to perform simultaneous transverse welding and cutting of said tubular web, said transverse seals extending in a transverse direction perpendicular to said direction of travel,
   c) cutting said tubular web with a cutting edge comprised in said ultrasonic welding unit, wherein:
   said cutting in step c) is performed in a welded area of said transverse seal, while performing step b), and
   said ultrasonic welding unit comprises a single operation surface performing said transverse welding and cutting.

2. The method according to claim 1, wherein step b) comprises
   b1) applying a pressure to said tubular web in a zone corresponding to an intended location of one of said transverse seals, thereby moving at least a portion of said filling material away from said zone, and thereafter
   b2) ultrasonically welding while continuing to apply said pressure in said zone, step c) being performed while performing step b2).

3. The method according to claim 1, wherein said method further comprises pulling said web at least in said direction of travel, said pulling being performed downstream of said transverse welding and cutting, thereby helping to separate said tubular web in said transverse cut.

4. The method according to claim 3, wherein said pulling is performed downstream of said transverse welding and cutting at a distance from said welding and cutting corresponding to the extension of said portion-packed oral pouched snuff product in said direction of travel.

5. The method according to claim 1, wherein step a) comprises:
   a1) supplying and advancing at least one web of said packaging material in said direction of travel,
   a2) supplying said continuous feed of filling material to said at least one advancing web of said packaging material,
   a3) arranging said at least one advancing web of packaging material to envelop said continuous feed of filling material, thereby forming said tubular web enveloping said continuous feed of filling material.

6. The method according to claim 5, wherein step a2) comprises supplying a plurality of continuous feeds of filling material in parallel to each other to said at least one advancing web of said packaging material.

7. The method according to claim 5, wherein step a3) comprises:
   longitudinally folding said at least one web of said packaging material to envelop said continuous feed of filling material, or
   supplying an additional web of packaging material to envelop said continuous feed of filling material.

8. The method according to claim 5, wherein step a) further comprises:
   a4) forming at least one longitudinal seal in said tubular web.

9. The method according to claim 1 further comprising:
   a5) longitudinally cutting said tubular web in or at said longitudinal seal while forming said longitudinal seal.

10. An arrangement for portion-packing of an oral pouched snuff product, said arrangement comprising:
    one or more supply units for supplying and advancing a tubular web of packaging material enveloping a continuous feed of filling material in a direction of travel,
    an ultrasonic welding unit for forming transverse seals in said tubular web across said continuous feed of filling material, wherein said welding unit comprises a cutting edge, and, wherein said welding unit is configured to perform simultaneous transverse welding and cutting of said tubular web, said welding unit comprising a single operation surface performing said transverse welding and cutting.

11. The arrangement according to claim 10, wherein said arrangement further comprises a pulling unit configured to pull said pouched product in said direction of travel, thereby helping to separate said tubular web in said transverse cut.

12. The arrangement according to claim 10, wherein said at least one supply unit comprises:
    a first feeding unit for supplying and advancing at least one web of said packaging material in said direction of travel,
    a second feeding unit for supplying said continuous feed of filling material to said at least one advancing web of said packaging material,
    a tubular forming unit for arranging said advancing web of packaging material to form said tubular web of packaging material, wherein
    said tubular forming unit is located before or after said second feeding unit.

13. The arrangement according to claim 12, wherein said tubular forming unit comprises a folding unit for longitudinally folding said at least one web of packaging material.

14. The arrangement according to claim 12, wherein said tubular forming unit comprises a third feeding unit for supplying an additional web of packaging material.

15. The arrangement according to claim 12, wherein said second feeding unit is configured to supply a plurality of continuous feeds of filling material parallel to each other to said at least one advancing web of packaging material.

16. The arrangement according to claim 15, comprising a plurality of longitudinal welding units for forming longitudinal seals, wherein at least one of said longitudinal welding units comprises a single operation surface with a cutting edge arranged between a first and a second welding surface.

17. The arrangement according to claim 10 further comprising:
    at least one longitudinal welding unit for forming a longitudinal seal in said at least one web of packaging material, said longitudinal welding unit.

18. The arrangement according to claim 17, wherein said longitudinal welding unit further comprises a cutting edge and is configured to perform simultaneous longitudinal welding and cutting of said tubular web.

19. The arrangement according to claim 18, wherein said longitudinal welding unit comprises a single operation surface performing both welding and cutting.

20. The arrangement according to claim 17, wherein said longitudinal welding unit comprises a first and a second welding component located at opposite sides of said tubular web to form a gap, through which said tubular web is arranged to pass, each of said first and a second welding component having an end, which faces a planar extension of said tubular web, at least one of said ends having a curvature.

21. The arrangement according to claim 17, wherein said longitudinal welding unit comprises a first and a second welding component located at opposite sides of said tubular web to form a gap, through which said tubular web is arranged to pass, wherein at least one of said first and second welding component is inclined in relation to said planar extension of said tubular web with an angle being in the range of 60°-90°.

* * * * *